United States Patent [19]

Hadden, Sr.

[11] Patent Number: 4,625,936

[45] Date of Patent: * Dec. 2, 1986

[54] FLEXIBLE SUPPORT AND CARRIER ASSEMBLY

[75] Inventor: Edward L. Hadden, Sr., Mechanicsburg, Pa.

[73] Assignee: Sine Products Company, Mt. Clemens, Mich.

[ * ] Notice: The portion of the term of this patent subsequent to Apr. 15, 2003 has been disclaimed.

[21] Appl. No.: 501,202

[22] Filed: Jun. 6, 1983

[51] Int. Cl.⁴ .......................................... F16M 13/00
[52] U.S. Cl. .................................. 248/544; 138/120; 248/51
[58] Field of Search .................. 248/51, 49, 58, 63, 248/544, 646, 647, 664; 138/120, 121, 122, 155; 137/615; 74/608

[56] References Cited

U.S. PATENT DOCUMENTS

| | | | |
|---|---|---|---|
| 1,153,187 | 9/1915 | Berry | 138/120 |
| 1,523,987 | 1/1925 | Spreen | 248/646 |
| 2,967,684 | 1/1961 | Knecht | 137/615 |
| 2,972,857 | 2/1961 | Bodman | 248/58 |
| 3,053,358 | 9/1962 | Gross | 248/49 |
| 3,190,286 | 6/1965 | Stokes | 138/120 |
| 3,266,059 | 8/1966 | Stelle | 138/120 |
| 3,330,105 | 7/1967 | Weber | 138/120 |
| 3,475,990 | 11/1969 | Maximuk | 74/608 |
| 3,503,579 | 3/1970 | Kurlandsky | 248/51 |
| 3,590,854 | 7/1971 | Cork | 248/49 |
| 3,872,881 | 3/1975 | Miller et al. | 248/51 |
| 4,129,277 | 12/1978 | Tenniswood | 248/51 |
| 4,228,825 | 10/1980 | Moritz et al. | 138/120 |
| 4,462,565 | 7/1984 | Johnson | 248/51 |

Primary Examiner—Ramon O. Ramirez
Attorney, Agent, or Firm—Lon H. Romanski

[57] ABSTRACT

A flexible support and carrier assembly for supporting an associated accessory is shown having a plurality of sequentially arranged body-like segments, the segments being arranged with respect to each other for articulated motion as between adjacent segments, the plurality of sequentially arranged body-like segments define an elongated articulated structure having first and second ends, a spring operatively carried by the articulated structure resiliently resists while permitting articulated motion as between adjacent segments to occur in a first direction of articulation, the spring also resiliently urges the adjacent segments to experience articulated motion in a second direction of articulation opposite to the first direction, and guard portions carried at least by certain of the segments, the guard portions functioning to prevent the unintentional incursion of unrelated objects into spaces between the adjacent segments when experiencing articulation.

26 Claims, 28 Drawing Figures

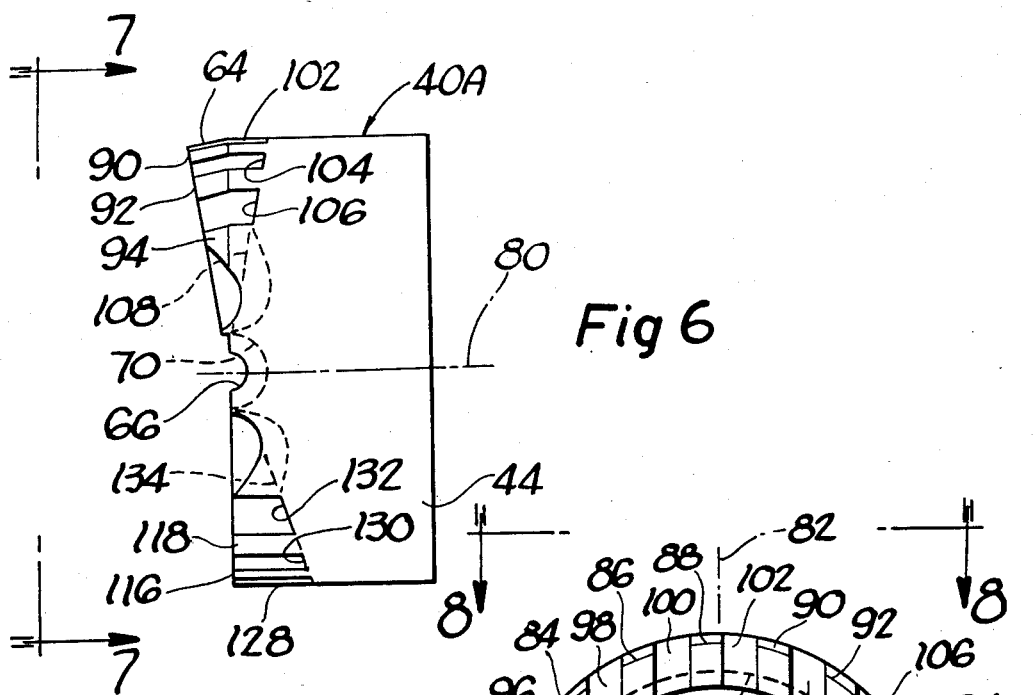
Fig 6
Fig 7
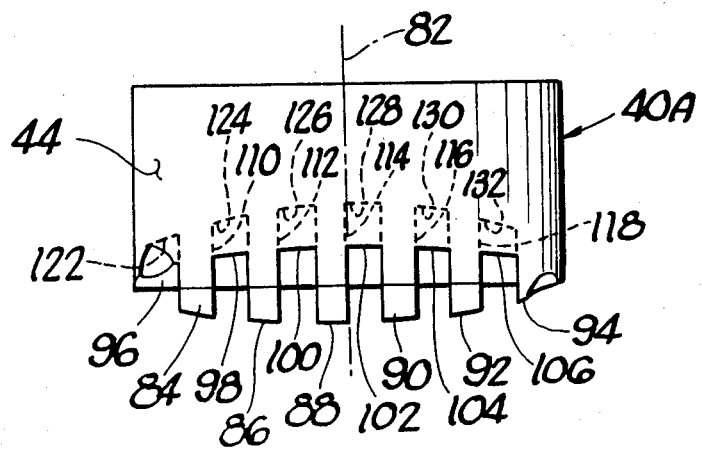
Fig 8

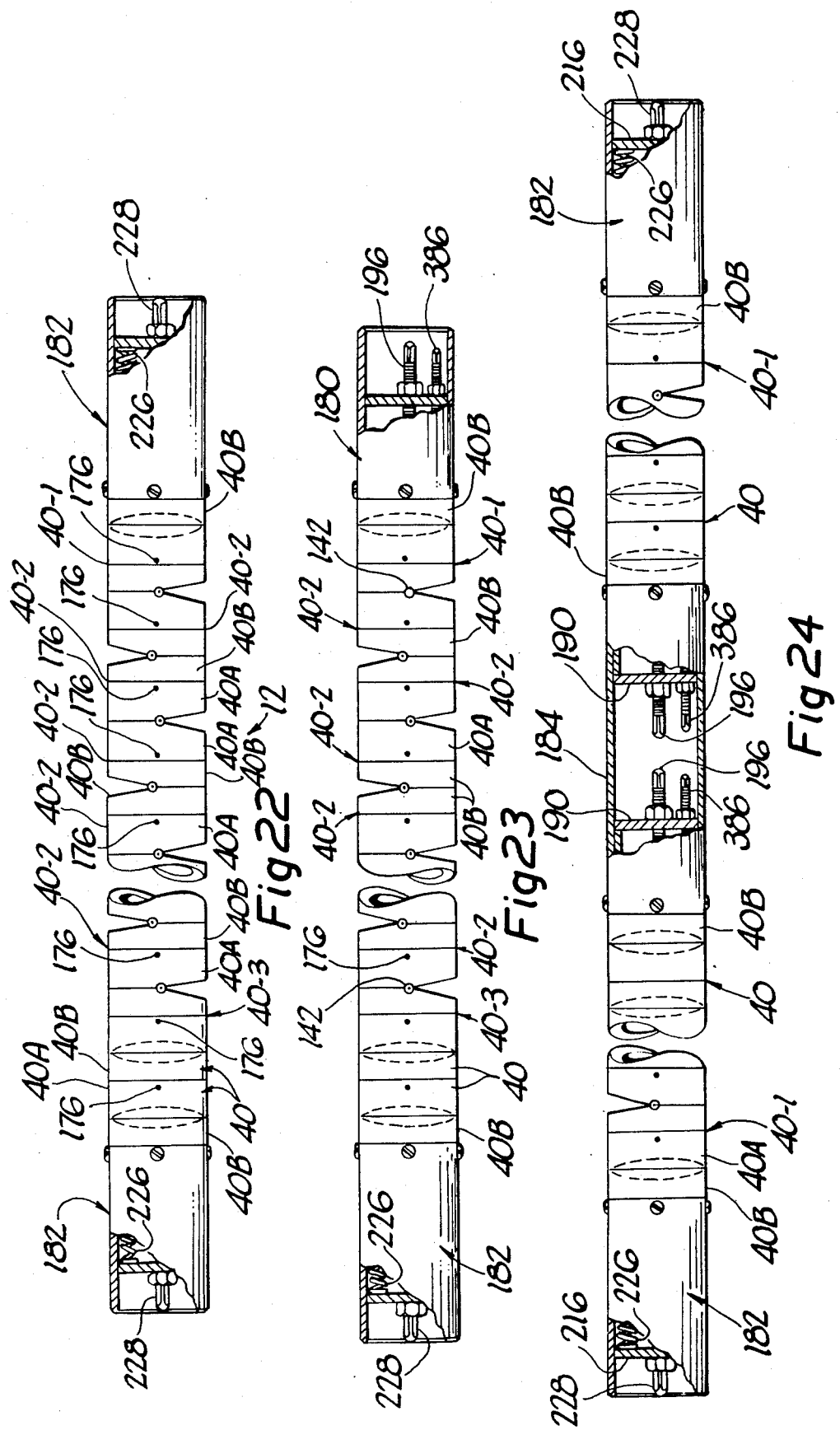

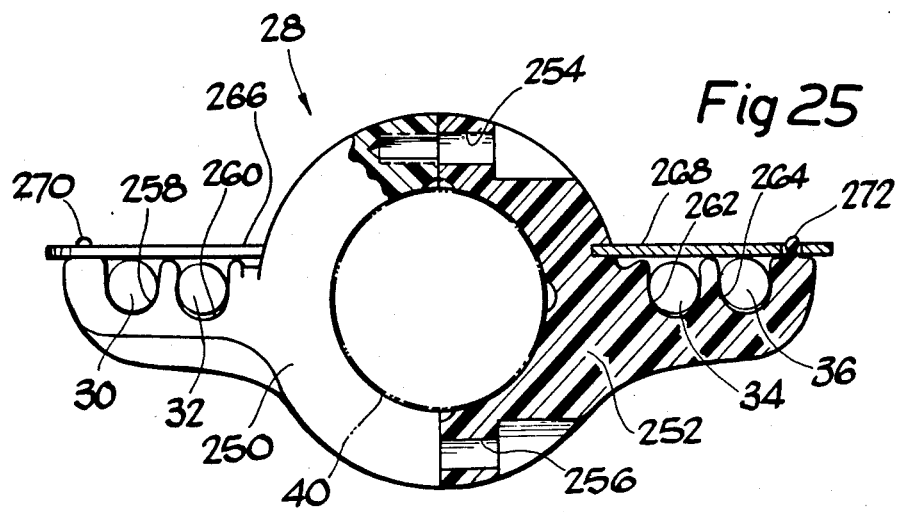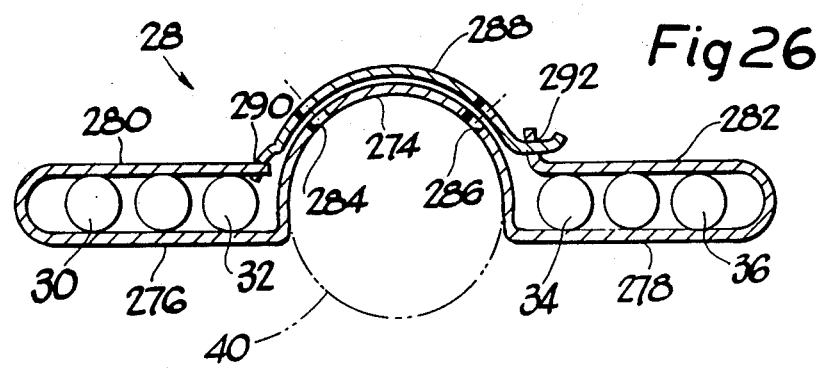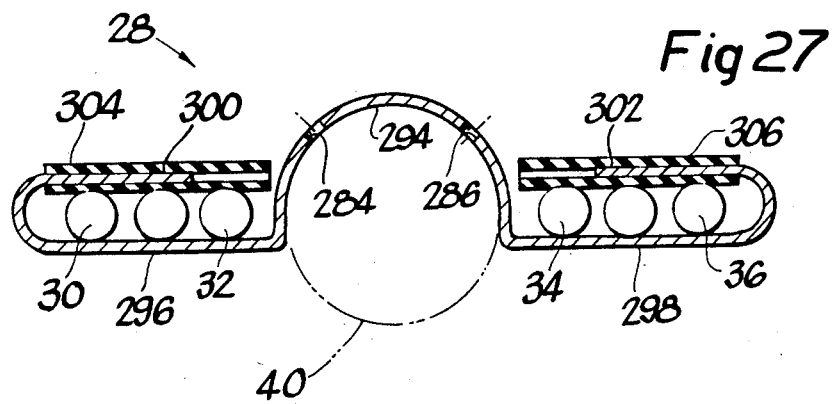

FLEXIBLE SUPPORT AND CARRIER ASSEMBLY

FIELD OF THE INVENTION

This invention relates generally to the field of support or carrier assemblies and more particularly to such support or carrier assemblies which are movable while performing the support or carrier function.

BACKGROUND OF THE INVENTION

Heretofore, the prior art has proposed use of, what is often referred-to as, "cable and hose carriers" in association with, for example, machine tools and/or robotic production devices and apparatus. Such prior art carriers were intended to support and control the position of such items as, for example, electrical power, signal and control conductors and cables as well as hoses as for coolant or other fluids. Further, the support and control thusly provided was for the purpose of enabling such conductors and/or cables and/or hoses to move with a moving or movable portion of the associated machine tool or other production or gauging apparatus without requiring the moving or movable portion of the associated machine tool or other production or gauging apparatus to support the full weight of the conductors, cables and/or hoses.

Quite often, especially in such applications as robotic welders, the moving or movable portion of the robotic welder is an arm-like assembly which must extend a relatively great distance, in an unsupported manner, in order to perform its welding function. Further, often the work piece is in motion while the welding operation is being performed. This, in turn, requires that the associated conductors, cables and/or hoses also move with the arm-like assembly. The extended nature of the arm along with the weight of the associated conductors, cables and/or hoses and coolant requires a comparatively more strongly constructed arm-like assemblies which, consequently, weigh more and require motors of greatly increased horsepower merely to be able to properly move such arm-like assemblies.

As already generally indicated, the purpose of such prior art carriers was to eliminate the need for the moving or movable portion of the machine tool or other production or gauging apparatus to have to support the full weight of the associated conductors, cables and/or hoses etc. while still having such move with the moving portion of the machine.

One form of such prior art carriers is sold under the trademark "GORTRAC" which is a registered trademark, in the United States of America Patent and Trademark Office, of A and A Manufacturing Company, Inc., having an address of 2300 South Calhoun Rd., New Berlin, Wis., U.S.A. The said "GORTRAC" brand carrier is illustrated in a publication of said A and A Manufacturing Company, Inc., identified as *Bulletin PR*100-*E* and bearing a U.S.A. copyright notice, by said A and A Manufacturing Company, Inc., of 1981. The prior art carrier illustrated therein is typical of the prior art carrier structures in that such are generally limited to only a "to-and-fro" motion which, in effect, limits the connected associated conductors, cables and/or hoses to movement in generally a single plane and within such plane to only two directions which are opposite to each other.

Even though to some extent such prior art support and carrier structures have been successful they are, nevertheless, usually comparatively very heavy and exhibit undesirable inertia and, further, are generally incapable of anything other than single-plane movement. In contrast, especially in robotic applications, the actual needs are quite opposite; that is, the weight and inertia of the support and carrier structure should be as little as possible and, further, the support and carrier structure should have motion capabilities whereby the connected associated conductors, cables and/or hoses can move, simultaneously, with the moving portion of the machine, in three directions of movement, if necessary.

It has been suggested that the prior art carrier structures, of single-plane movement, could be combined in order to provide, for example, movement in two planes. That is, one of such prior art carrier structures could, in effect, be used to support a second of such prior art carrier structures with the thusly two combined carrier structures being arranged so that their respective paths of motion be transverse (perpendicular) to each other. Such resulting structures are comparatively very heavy and exhibit increased inertia and, unfortunately, still provide for those portions of the associated conductors, cables and/or hoses as are connected to the moving portion of the machine, to move only in a single plane.

The invention as herein disclosed and described is primarily directed to the solution of the aforestated as well as other related and attendant problems of the prior art.

SUMMARY OF THE INVENTION

According to the invention, a flexible support and carrier assembly for supporting associated accessory means, comprises a plurality of sequentially arranged body-like segments, said segments being arranged with respect to each other for articulated motion as between adjacent segments, said plurality of sequentially arranged body-like segments defining an elongated articulated structure having first and second ends, and spring means, said spring means resiliently resisting while permitting said articulated motion as between adjacent segments to occur in a first direction of articulation, said spring means also resiliently urging said adjacent segments to experience said articulated motion in a second direction of articulation opposite to said first direction.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views;

FIG. 6 is a side elevational view of the element in FIG. 3 in a form as may occur during another stage of its construction;

FIG. 7 is a view taken generally on the plane of line 7—7 of FIG. 6 and looking in the direction of the arrows;

FIG. 8 is a view taken generally on the plane of line 8—8 of FIG. 7 and looking in the direction of the arrows;

FIGS. 22, 23 and 24 are simplified elevational views, partly broken away and cross-hatched, depicting, in a scale reduced as compared to FIGS. 2–21, various possible arrangements of the elements disclosed;

FIGS. 25, 26 and 27 illustrate in cross-section some of the hanger means which may be employed in practicing the invention.

DETAILED DESCRIPTION OF THE PREFERRED EMBODIMENT

Figure 1:
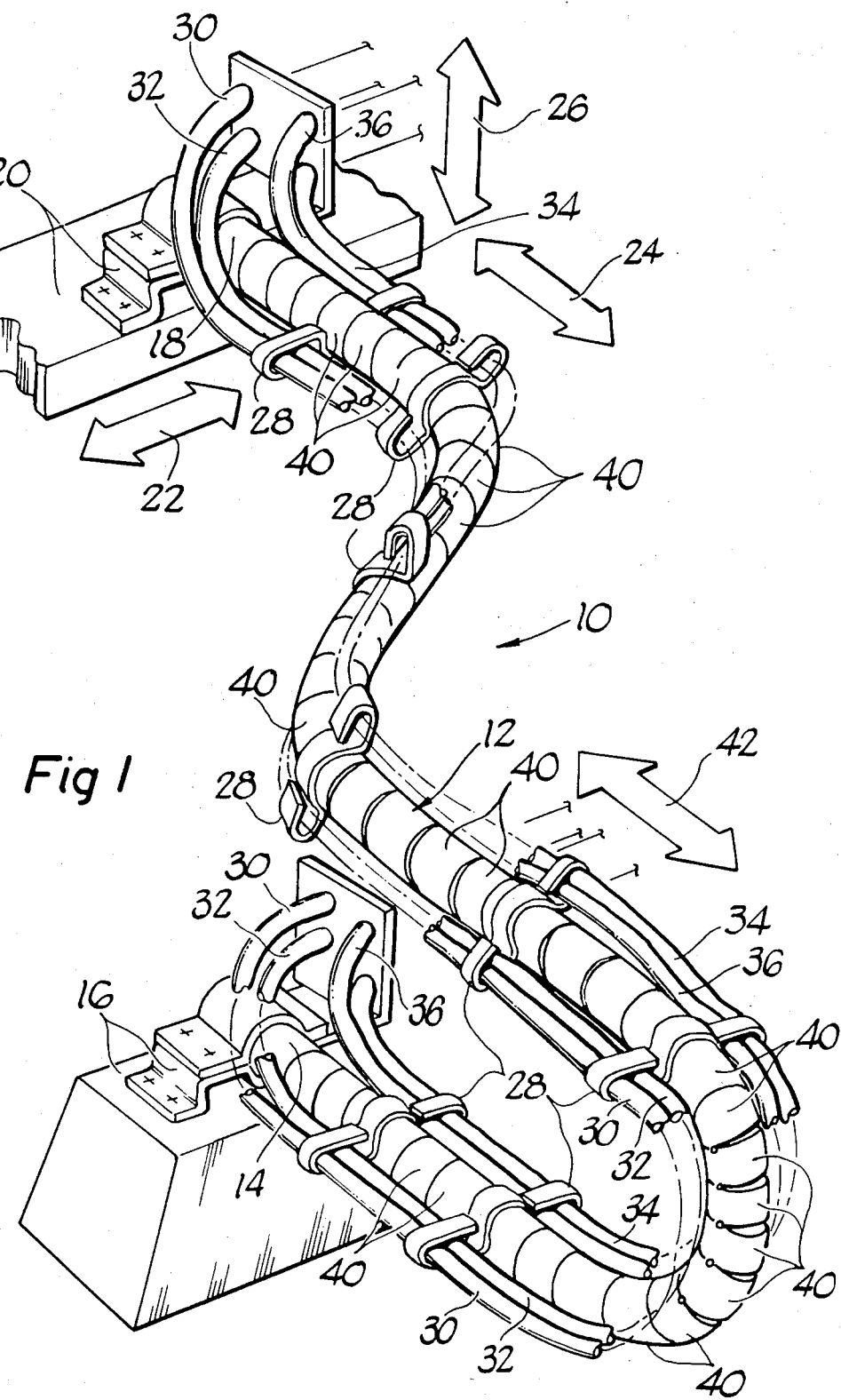
FIG. 1 is a somewhat simplified perspective view of a flexible support and carrier assembly embodying teachings of the invention.

Referring now in greater detail to the drawings, FIG. 1 illustrates a flexible support and carrier assembly 10, employing teachings of the invention, as comprising a generally elongate main body portion 12 which has a first end portion 14, suitably fixedly secured as to a base means 16, and a second end portion 18 suitably secured as to a movable portion 20 of a related or associated machine or the like. The movable machine portion or member 20 is depicted as capable of experiencing and undergoing movement: (a) in either of opposite directions in the generally horizontal plane as indicated by double-ended arrow 22; (b) in either of opposite directions, generally transverse to the directions of arrow 22, as indicated by double-ended arrow 24 and (c) in either of opposite vertical directions as depicted by double-ended arrow 26.

FIG. 1 also illustrates that a plurality of hanger or support members 28 which may be operatively secured to said elongate body 12 as at spaced locations therealong. Such hanger members 28, in turn, are shown as supporting accessory means 30, 32, 34 and 36 related to the associated machine structure or the like. By way of example and not of limitation, such: (a) accessory means 30 and 32 may be coolant feed and return flexible conduits with the ends thereof shown in the lower portion of FIG. 1 being respectively operatively connected to a source of such coolant and to a sump; (b) accessory means 34 may comprise all of the electrical cables for supplying operating power and control signals to the associated machine structure with the end of such cable means shown in the lower portion of FIG. 1 being operatively connected to a source of such electrical power, and quite probably related electronic control means, and the end of the cable means shown in the upper portion of FIG. 1 being operatively connected to the various electrical power consuming means, employed by the associated machine structure, as well as possibly electrical signal generating feedback means and (c) accessory means 36 may actually comprise a flexible conduit as for conveying, for example, an inert gas from a suitable source to the area of a welding electrode engaging a work piece.

As will hereinafter be described in greater detail, the flexible elongated body 12 is comprised of a plurality of sequentially situated body-like or housing-like sections 40 which are operatively connected to each other in such a manner as to provide for articulated motion as between adjacent body-like sections 40. The selected and controlled articulation of such segments 40 results in an overall elongate body 12 which, for example, has an upper end (as viewed in FIG. 1) which freely follows the various possible motions depicted or represented by arrows 22, 24 and 26 and in so doing may have a portion which, at a relatively lower level, may move to-and-fro in directions generally depicted by arrow 42 thereby automatically adjusting the effective overall length of the body 12 for the then existing conditions as determined by the position of means 20.

Figures 12, 13:
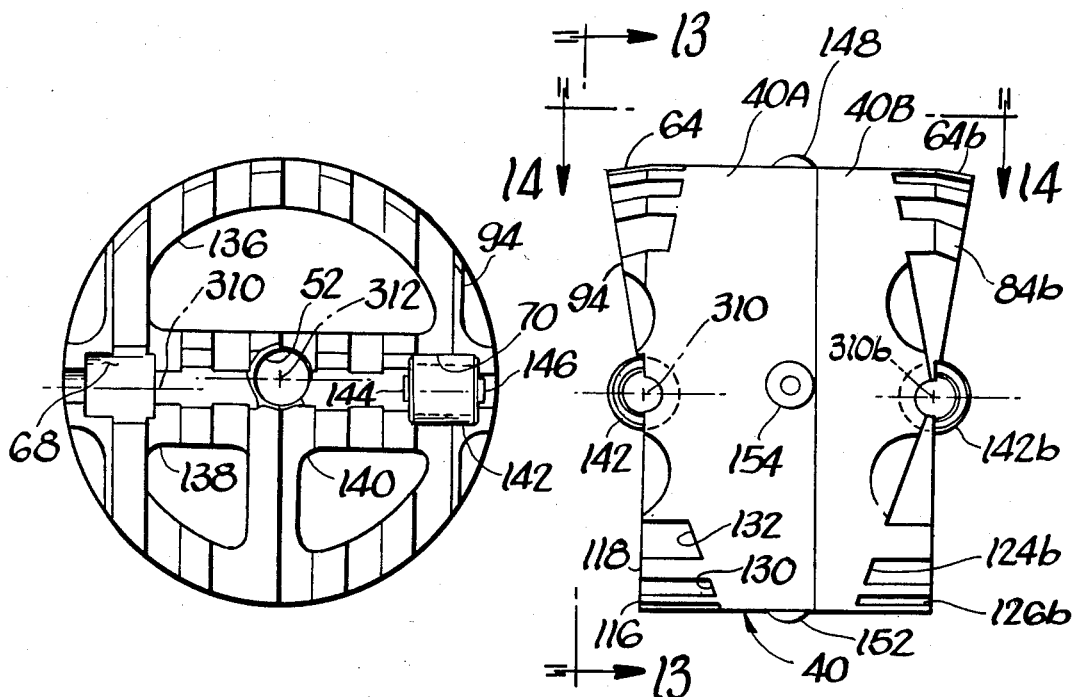
FIG. 12 is a side elevation of the assembly of two elements as generally respectively illustrated in FIGS. 6 and 9.
FIG. 13 is a view taken generally on the plane of line 13—13 of FIG. 12 and looking in the direction of the arrows.

In the main, each of the plurality of body-like or housing-like segments 40 is, in the preferred embodiment, comprised of cooperating body or housing portions 40A and 40B with body portions 40A possibly being referred to as a bell body portion and body portion 40B possibly being referred to as a spigot body portion such being merely with reference to the fact that in the embodiment disclosed a part of the spigot portion 40B is operatively received within bell portion 40A. FIG. 12 illustrates such a housing-like or body-like segment 40 formed of assembled bell and spigot portions 40A and 40B.

Figure 2:
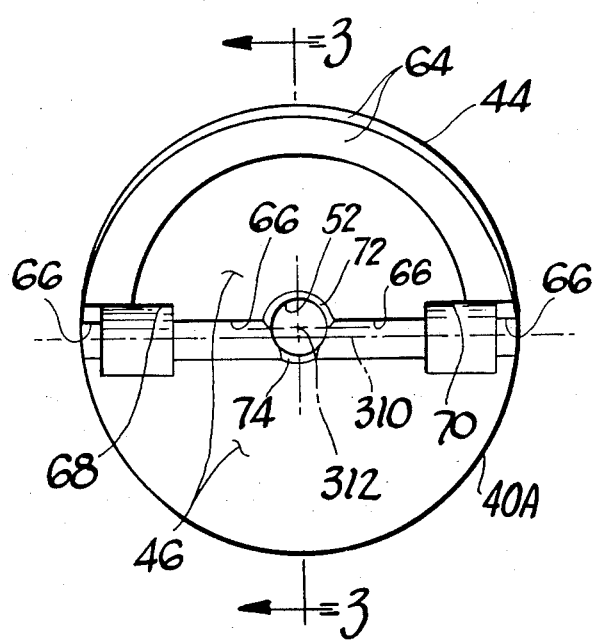
FIG. 2 is an end view of one of the elements, generally shown in FIG. 1 and in reduced scale there, in a form as may occur during a stage of its construction.
Figure 5:
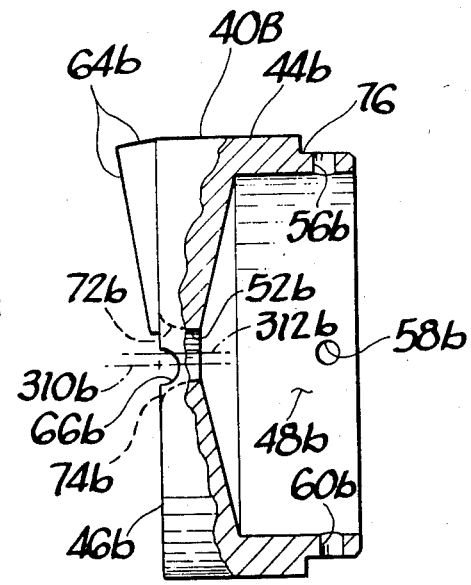
FIG. 5 is a view similar to FIG. 3 illustrating an other element, generally shown in FIG. 1 and in reduced scale there, which cooperates with other elements such as that shown in FIG. 3.
Figure 4:
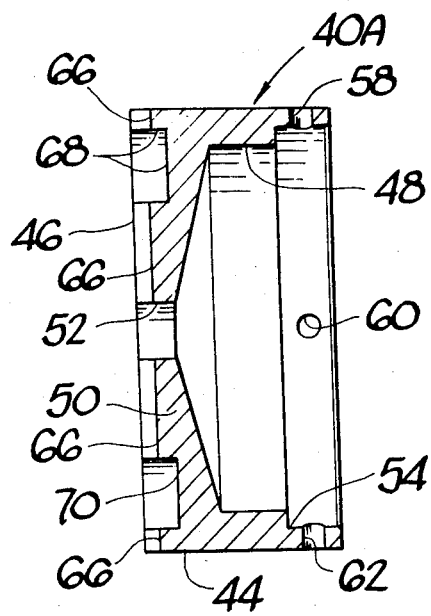
FIG. 4 is a cross-sectional view taken generally on the plane of line 4—4 of FIG. 3 and looking in the direction of the arrows.
Figure 3:
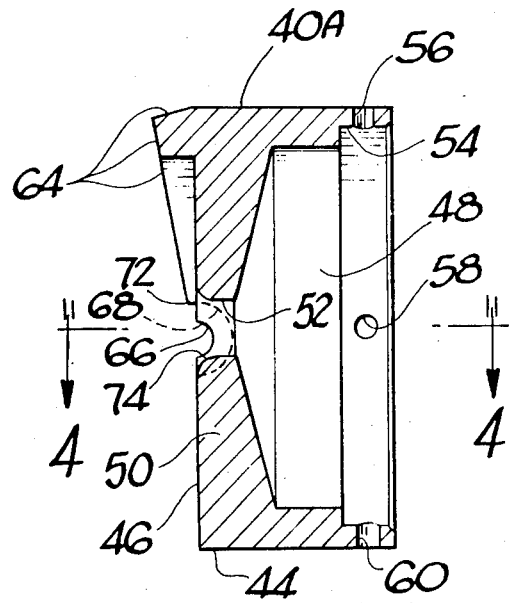
FIG. 3 is a cross-sectional view taken generally on the plane of line 3—3 of FIG. 2 and looking in the direction of the arrows.
Figure 9:
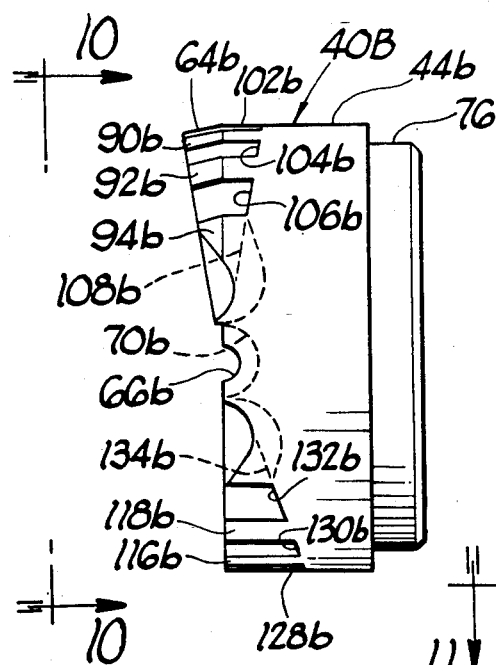
FIG. 9 is a side elevational view of the element in FIG. 5 in a form as may occur during another stage of its construction.
Figure 10:
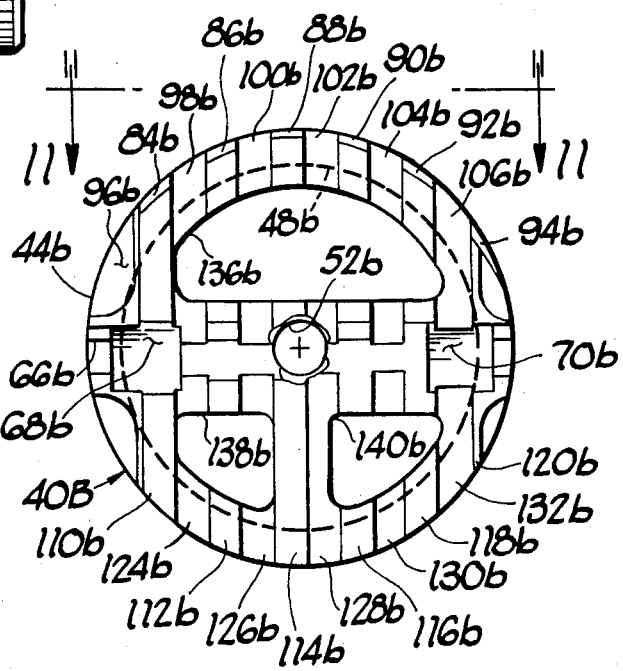
FIG. 10 is a view taken generally on the plane of line 10—10 of FIG. 9 and looking in the direction of the arrows.
Figure 11:
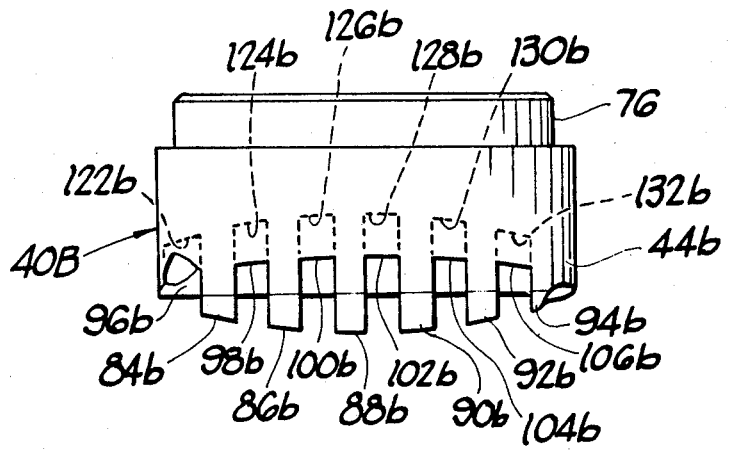
FIG. 11 is a view taken generally on the plane of line 11—11 of FIG. 10 and looking in the direction of the arrows.

FIGS. 2, 3 and 4 illustrate one of the typical bell body portion 40A as in a particular stage of its production. Although the body portions 40A and 40B may be formed of any suitable material it is preferred that such be formed of aluminum alloy such as, for example, Grade 2024-T3 aluminum alloy. Further, even though the outer configuration of the body portions 40A and 40B may be other than circular in cross-section, such as for example, square, in the preferred embodiment such body portions 40A and 40B are of circular outer configuration, in cross-section; however, as should be apparent, the teachings herein presented with respect to such circular body portions 40A and 40B, and their operation, apply equally well to such functionally equivalent body portions of outer configurations other than circular.

Referring in greater detail to FIGS. 2, 3 and 4, the bell body portion 40A is illustrated as having been machined as to provide an outer cylindrical surface 44 (which may actually be the diameter of round bar stock) with a first generally flat axial end face 46 and a cup-like recess or chamber 48 formed into the opposite axial end as to result in an end wall 50 through which is formed an aperture or passage 52. The chamber or cavity 48 is provided with a generally stepped or diametrically enlarged portion 54 for the close reception therein of a cooperating portion of spigot body portion 40B. A plurality of passages 56, 58, 60 and 62 are formed through bell body portion 40A in a manner as to have passages 56 and 60 aligned with each other and the common axis thereof normal to the axis of, for example, outer cylindrical surface 44, while passages 58 and 62 would be aligned with each other and have the common axis thereof normal to the axis of, for example, outer cylindrical surface 44 and the common axis of passages 56 and 60.

The upper portion of the bell body portion 40A (as viewed in FIGS. 2 and 3) is provided with an arcuate eye-lid like extension 64 which, as will be subsequently described, is employed in forming a plurality of spaced fins, fingers or individual extensions. As best seen in FIGS. 2 and 4, a semicylindrical passage 66 is formed generally into face 46 and transversely thereof as to have the longitudinal axis generally coincident with a diameter of, for example, the outer cylindrical surface 44. As depicted in FIG. 2, the eye-lid portion 64 is situated generally to one side of the passage 66 and, as viewed in FIG. 2, above such passage 66. Further, axially aligned semi-cylindrical bearing or pivot recesses 68 and 70 are formed generally in face 46 and in alignment with the axis of passage 66. In the preferred embodiment, the upper portion of aperture or passage means 52 is rounded or flared as indicated generally by the arcuate sector 72 in FIG. 2 and, also at 72, in FIG. 3. Similarly, the lower portion of aperture or passage means 52 is rounded or flared as indicated generally by the arcuate sector 74 in FIG. 2 and, also at 74, in FIG. 3.

In the preferred embodiment, body portions 40A and 40B are identical to each other except for the fact that in the bell body portion 40A the relatively enlarged inner diameter 54 closely slidably receives the reduced pilot-like outer diameter 76. For ease of description, all elements of spigot body portion 40B which are like those of the bell body portion are identified with like reference numerals provided with a suffix "b".

Referring in greater detail to FIGS. 6, 7 and 8, which illustrate the bell body portion 40A in another stage of its production, in the preferred embodiment the eye-lid like portion 64 as well as the lower (below axis or mid-plane 80 in FIG. 6) portion of wall 50 (see FIG. 3) are formed with a plurality of spaced slots arranged as to be vertically extending and perpendicular to the axis of the bearing or pivot means to be received in recesses 68 and 70. The slots are so formed as to define vertically extending (as viewed in FIGS. 6 and 7) spaces which, in turn define finger-like or fin-like extensions therebetween, also extending vertically. In the preferred arrangement, the upper and lower slots (as viewed in, for example, FIGS. 6 and 7) are aligned, such will be numbered with different reference numbers for ease of understanding. Further, the slots are formed into the eye-lid like portion 64 as to not be centered or symmetrical with respect to a vertical plane as depicted at 82 and passing through the center of the body 40A.

Generally, the upper array of fins or fingers 84, 86, 88, 90, 92 and 94 are formed of generally uniform thickness or width as a consequence of spaced slots 96, 98, 100, 102, 104 and 106 which are of generally uniform width the magnitude of which is greater than the width of a fin or finger. As best seen in FIGS. 7 and 8, the teeth, or fingers 84, 86, 88, 90, 92 and 94 are so located as to result in tooth or finger 88 being slightly to one side of the said vertical plane 82. The upper slots or recesses 96–106 terminate as at a generally common plane, which may be inclined, depicted at 108.

The lower slots and fins or fingers are respectively aligned with the said upper slots and fins or fingers. The lower fins or fingers are at 110, 112, 114, 116, 118 and 120 with spaces or recesses at 122, 124, 126, 128, 130 and 132. The lower slots or recesses 122–132 terminate as at a generally common plane, which may be inclined, depicted at 134.

Further, as possibly best indicated in FIG. 7, a plurality of apertures or passages 136, 138 and 140 may be formed through the wall 50 (see FIG. 3) merely for purposes of reducing the weight of the body portion 40A.

Figures 14, 15:
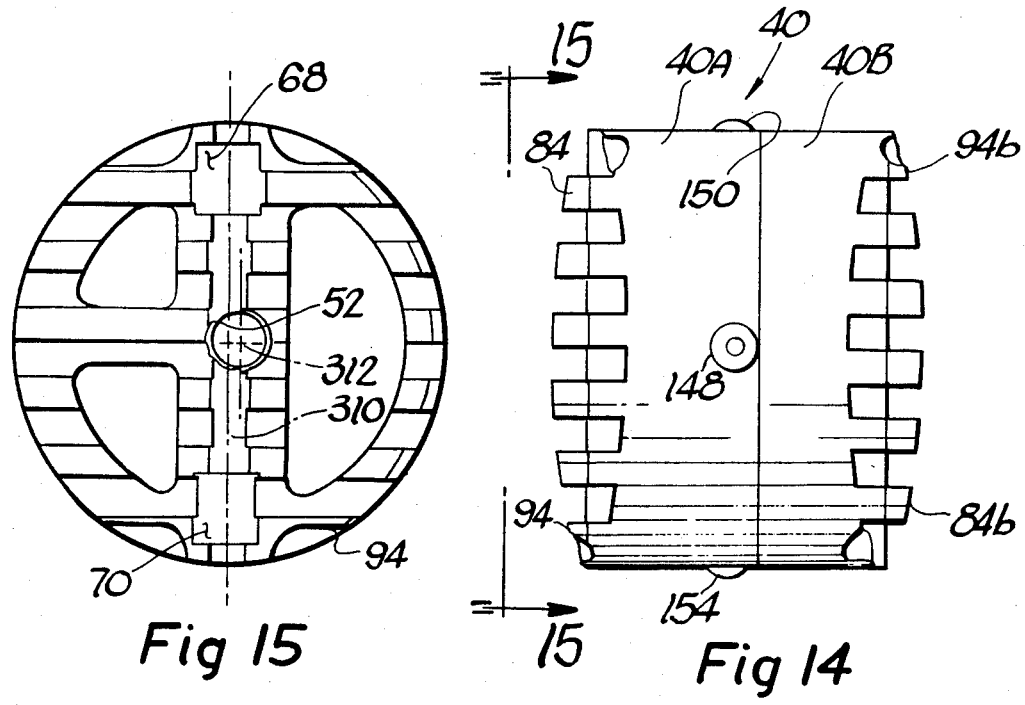
FIG. 14 is a view taken generally on the plane of line 14—14 of FIG. 12 and looking in the direction of the arrows.
FIG. 15 is a view taken generally on the plane of line 15—15 of FIG. 14 and looking in the direction of the arrows.

FIGS. 12 and 14 illustrate the assembly of bell housing portion 40A and spigot housing portion 40B into a body-like or housing-like segment 40. As typically illustrated in FIG. 13, a pivot or tubular bearing member 142 is received in the semicylindrical recess 70 and may be suitably retained therein as by peened portions 144 and 146. Only one such pivot or bearing means 142 need be provided for each bell housing portion and for each spigot housing portion because when two such housing portions are brought together the single bearing means of each housing portions combine to form two aligned bearing portions.

The two housing portions are assembled by inserting diameter 76 of spigot housing portion 40B into enlarged inner diameter 54 of bell housing portion 40A and aligning such as to align apertures or passages 56, 58, 60 and 62 of housing portion 40A with apertures or passages 56b, 58b, 60b and 62b of housing portion 40B, respectively. When such are thusly aligned, rivets 148, 150, 152 and 154 are inserted, and locked, through such aligned pairs, respectively. In the arrangement depicted as by FIGS. 12 and 14 the housing portions 40A and 40B are arranged with respect to each other as to have, when viewed in FIGS. 12 and 13, both sets of fins or teeth 84–94 and teeth 84b–94b at the upper part of housing segment 40 generally above the axis of bearing means 142 and 142b.

Figure 16:
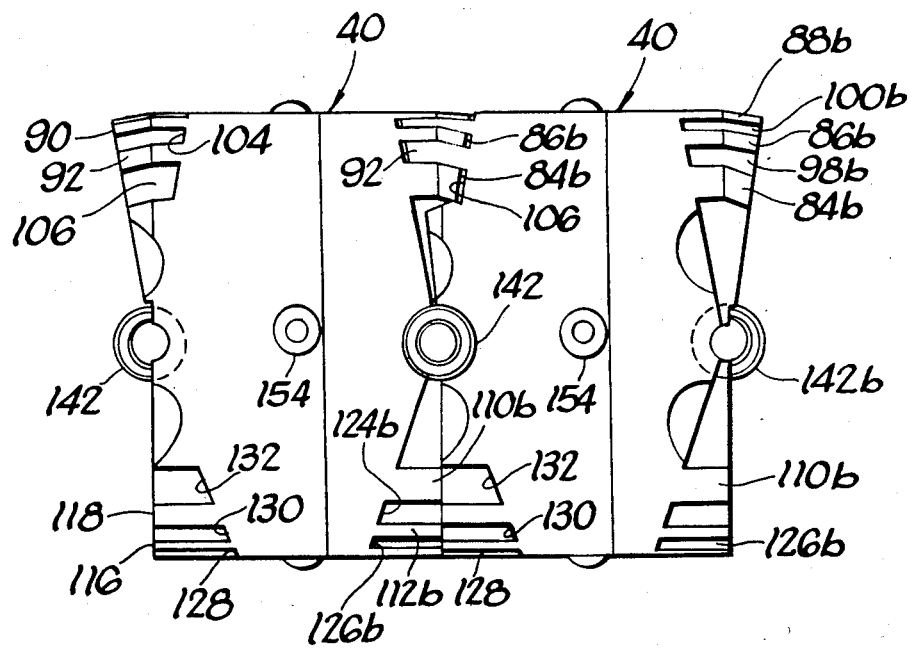
FIG. 16 is a side elevational view of two of the sub-assemblies, illustrated in FIG. 12, operatively connected to each other.
Figure 17:
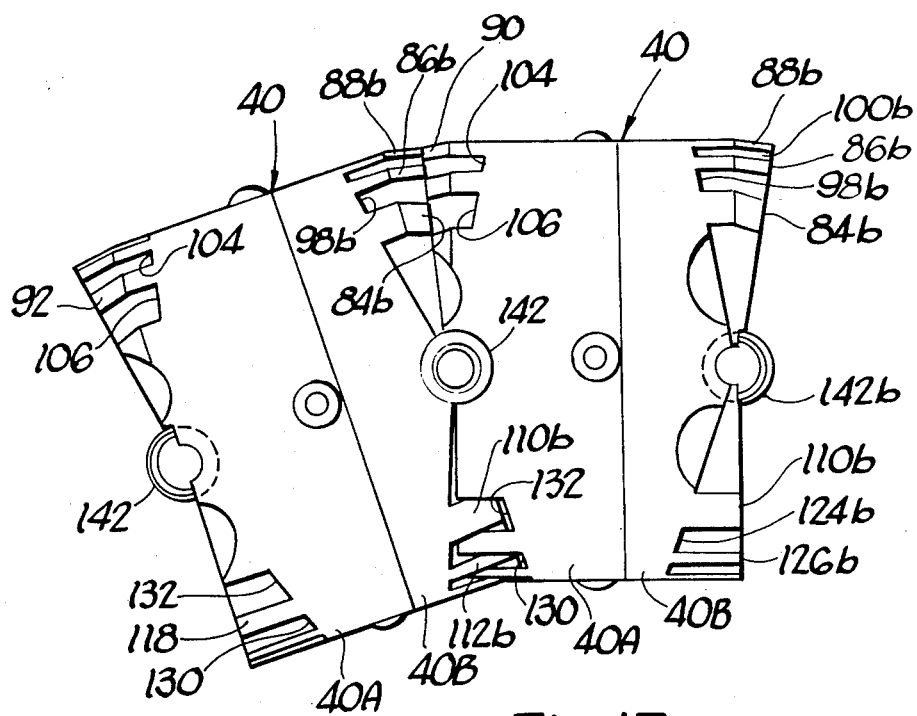
FIG. 17 is a view similar to that of FIG. 16 but illustrating the elements thereof in an operating position other than that shown in FIG. 16.

FIGS. 16 and 17, in side elevational view illustrate two adjacent housing-like or body-like segments 40 operatively connected to each other with the respective coacting fins or fingers and spaces in meshed engagement. Generally, when the housing segments 40 (left) and 40 (right), as viewed in FIG. 16 are in their respective, neutral, null or home position, such will assume a position with respect to each other as generally depicted in FIG. 16. However, when such housing-like segments 40—40 are caused to pivot or articulate with respect to each other, as about pivots 142 and 142b, and assume a maximum degree of relative deflection or articulation, such housing segments 40(left) and 40(right) will assume relative positions as generally depicted in FIG. 17.

When in the relative positions depicted in FIG. 16, the teeth or fingers 84b-94b are in maximum meshed engagement with fins or fingers 84-94 while lower disposed fins or fingers 110-118 and 110b-118b are in their least meshed engagement. In contrast, when the adjacent housing or body segments 40—40 are articulated to the relative positions of FIG. 17, the fins or fingers 84b-94b are in their least meshed engagement with fins or fingers 84-94 while lower disposed fins or fingers 110-118 and 110b-118b are in their maximum meshed engagement. As should be evident, such meshed fins or fingers serves to prevent the accidental lodging, of apparatus or a portion of a person's body, between adjacent housing segments 40. Therefore, it should be apparent that such meshed fins or fingers serve as guard means to prevent the unwanted incursion of objects into the structure as, for example, hoses or electrical power lines which for some reason may lie across such fingers or fins. If such body segments were not provided with such guard means but instead had only angled-back planar surfaces such would provide totally open spaces, as between juxtaposed pivotally cooperating body segments, into which a portion of a person's body or other apparatus could unwantingly be loged.

FIGS. 12-17 depicted housing or body segments 40 wherein the respective fins or fingers 84-94 and 84b-94b are at the same elevation. However, because of the passages 56-62 and 56b-62b, the housing or body portions 40A and 40B may be selectively rotatably indexed, by increments of 90°, relative to each other and then, in such relative positions secured to each other as by the rivets 148-154.

Figure 18:
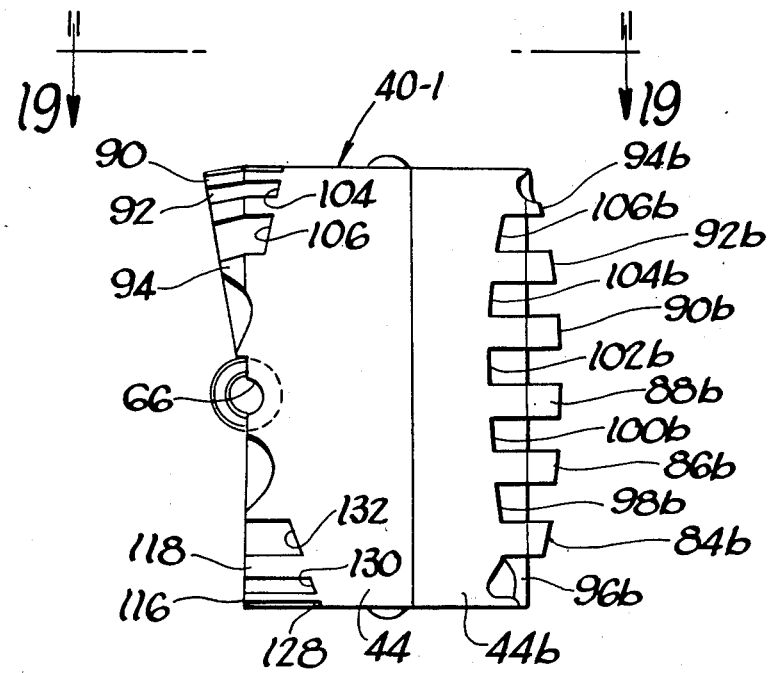
FIG. 18 illustrates the same elements shown in FIG. 12 but rotated 90°, with respect to each other, about their common centerline.
Figure 19:
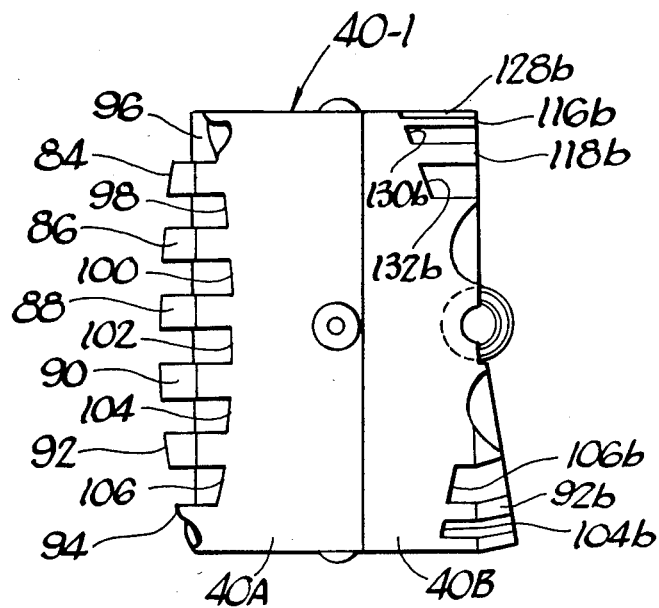
FIG. 19 is a view taken generally on the plane of line 19—19 of FIG. 18 and looking in the direction of the arrows.

FIGS. 18 and 19 illustrate only one such body segment 40-1 which, arbitrarily, indicates that housing portion 40B, in the embodiment of FIGS. 18 and 19, has actually been rotated (prior to being secured) 90° clockwise, as viewed in FIG. 13, relative to the position shown in FIG. 12, while maintaining the position of housing portion 40A. As a consequence, the axes of pivot or bearing means 142 (carried by housing portion 40A) and the axes of pivot or bearing means carried by housing portion 40B are perpendicular but skew to each other while in the embodiment the respective axes are parallel to each other.

From an inspection of FIGS. 18 and 19, it can be seen that if a housing segment 40 of FIG. 12 were connected to the left housing side of housing portion 40-1 of FIG. 18 and placed in its home or null position, that such would assume a relative position as that assumed by 40(left) of FIG. 16 relative to 40(right) of the same FIG. 16. If articulated, the segment would move counter-clockwise about the co-acting pivot or bearing means as to generally depend downwardly as depicted in FIG. 17. If a housing segment 40, as of FIG. 12, were connected to the right side of housing portion 40-1 of FIG. 19 and placed in its home or null position, such segment 40 would assume a relative position as that generally depicted in FIG. 16 but up-side-down. When such housing segment 40 would be articulated, it would swing generally upwardly about the co-acting pivot or bearing means. Accordingly, it should be apparent that the body or housing portion 40-1 provides for a transition (in this case by 90°) in the succeeding axes of articulation.

Another housing segment which could be arranged as to have the housing portion 40B indexed 180° relative to housing portion 40A, with such indexing being with respect to the relative positions shown in FIGS. 12-14, is arbitrarily numbered 40-2. In such an arrangement the articulation of a housing segment adjacent to one end of segment 40-2 would be generally opposite to the articulation of a housing segment adjacent to the other end of the segment 40-2. Further, a fourth housing segment can be arranged as to have the housing portion 40B indexed 90° counter-clockwise, as viewed in FIG. 13, relative to the position shown in FIG. 12, while maintaining the position of housing portion 40A. As a consequence, the axes of articulation at either end would be as that shown in FIGS. 18 and 19 with the exception being that the relative direction of articulation would be generally opposite to that experienced by the structure of FIGS. 18 and 19.

As generally and in a somewhat simplified manner illustrated in FIGS. 22, 23 and 24, various selected housing-like or body-like segments are operatively connected to each other, employing the pivot or bearing means between adjacent body segments, and held in an assembled and operative condition as by resilient means to be described.

In FIG. 22, the various rivet means (functionally equivalent to any of rivets (148-154) are, for simplicity, identified by a single reference 176. As will become apparent, in the preferred embodiment, cable means passed through the sequentially situated housing segments, serves to maintain such segments in an operative state and provide the desired working forces. Generally, the said cable means is operatively connected as at one end to an anchor end assembly and, at its other end, to a load or force cell assembly.

Figure 20:
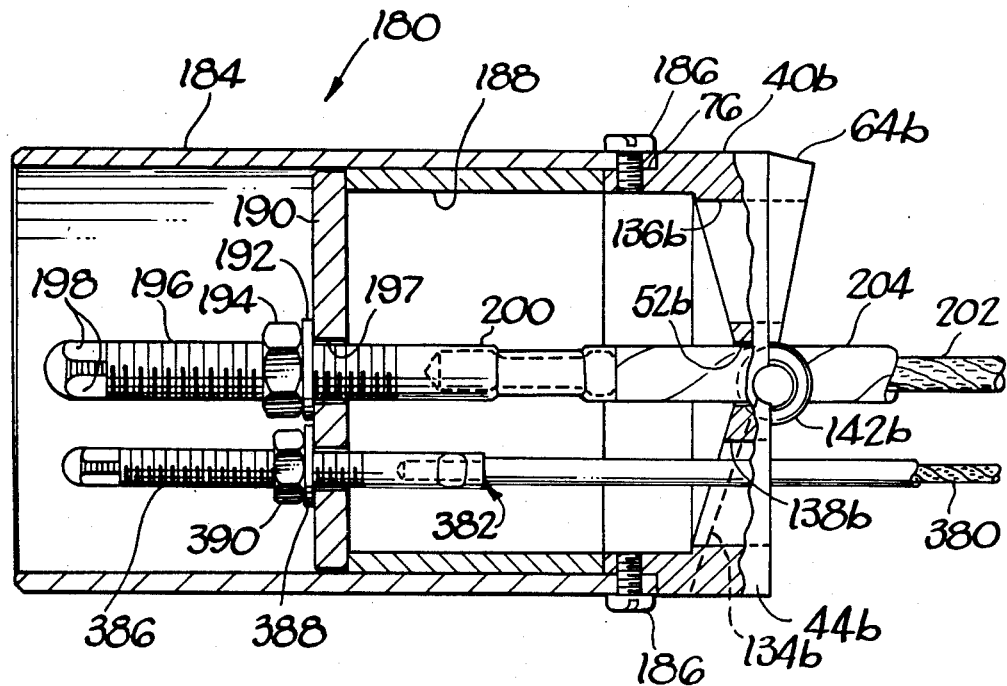
FIG. 20 is a generally axial cross-sectional view of a portion of a cable assembly employable in practicing the invention.

FIG. 20 illustrates the preferred embodiment of the anchor end assembly 180 as comprising an outer tubular housing 184 having screws 186, or the like, extending through the wall of such housing and secured as to a spigot body portion 40B. The screws 186 may actually be received as by the passages 56b-62b of the spigot body portion 40B. A tubular inner spacer 188 serves to hold an anchor plate 190 which, in turn, serves as an abutment for a washer 192 and nut 194 threadably engaged with a threaded rod portion 196 extending through an aperture 197 formed in plate 190 and preferably provided with tool-engaging surface means 198. The other end 200 of threaded rod 196 is suitably secured as to a related fitting carried by the steel cable means 202. In the preferred embodiment, the cable means 202 is provided with sheathing 204, effectively the full length of such cable means 202; such sheathing may, for example, take the form of nylon tubing. As depicted, the cable means 202 and sheathing 204 pass through the aperture or passage means 52b. It should be noted that for clarity, the fins or fingers 84b-94b and 110*b*–120*b*, although formed on the spigot body housing 40B of FIG. 20, are not shown.

Figure 21:
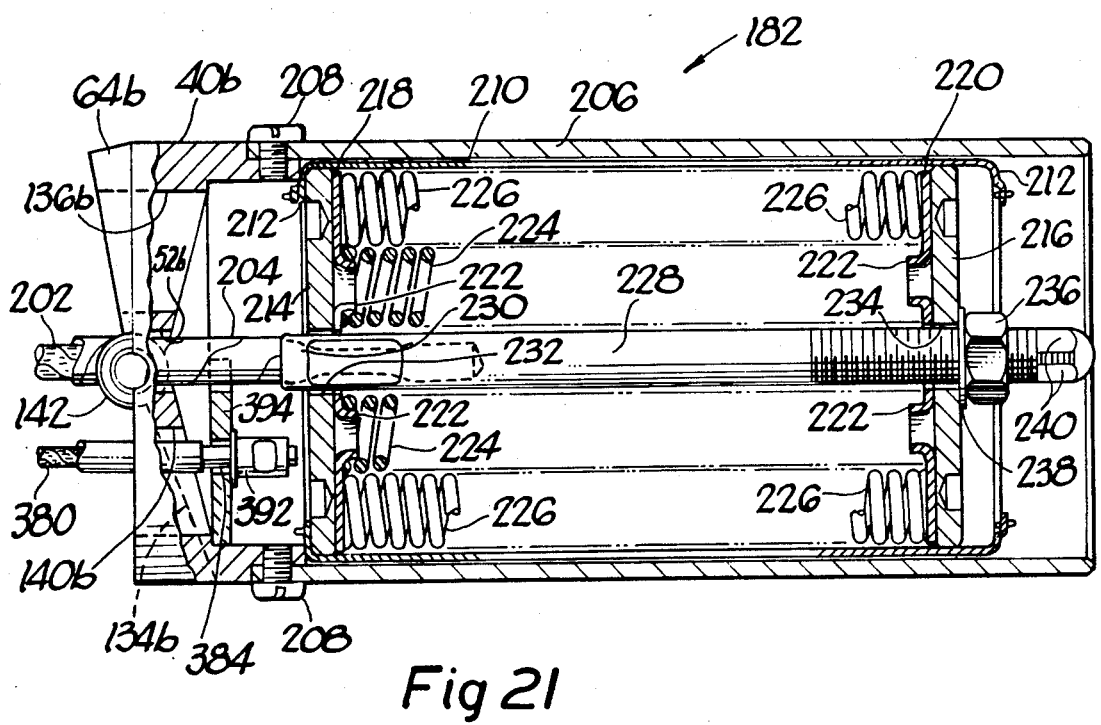
FIG. 21 is a generally axial cross-sectional view of a spring assembly and a portion of the cable assembly, of FIG. 20, employable in practicing the invention.

In FIG. 21 the load or force cell assembly 182 is illustrated as comprising an outer tubular housing 206 which, at its left end as viewed in FIG. 21, is operatively connected to a spigot body portion 40B as by screws 208 extending through the wall of such housing and secured as to spigot body portion 40B. Screws 208 may actually be received as by the passages 56*b*–62*b* of the spigot body portion 40B. A generally tubular retainer shell 210 having its ends 212 turned generally radially inwardly is situated within outer housing 206 and axially abuts against the axial end face of spigot body portion 40B.

Respective disc-like spring end plates 214 and 216 are situated at generally opposite ends and contained as by the end walls 212. Further annular spring locators 218 and 220 are respectively situated against the end plates 214 and 216. Such locators 218 and 220 may comprise spring perches or locating portions 222—222 between coacting pairs of which suitable compression springs 224 may be situated. An additional array of compression springs 226 may be provided generally about the inwardly situated springs 224.

An axially extending threaded rod 228, operatively connected as at its end 230 to a fitting carried by the cable means 202, freely passes through apertures or passages 232 and 234 of end plates 214 and 216 and abuts against the end plate 216 as through a threaded nut 236 and washer 238. The rod 228 is provided with tool engaging surface means 240. As should be apparent, with a resistance placed on cable means 202, the greater spring means 224 and 226 are compressed, the greater the tension applied to such cable means.

Again, for sake of clarity, the fins or fingers 84*b*–94*b* and 110*b*–120*b*, formed on the spigot body housing 40B, are not shown in FIG. 21.

In the assembly of the various elements comprising the flexible support assembly, the cable means 202 is caused to extend as through all the apertures or passages 52 and/or 52*b* of all of the body or housing portions 40A and 40B as exist between the functional ends of such cable means 202.

The embodiment of FIG. 22 illustrates that if desired, the respective ends of the articulated body means 12 could each be formed of a load or force cell assembly 182 with the cable means 202 and sheathing 204 extending through all of the body portions 40A and 40B between such ends.

The embodiment of FIG. 23 illustrates that if desired, the respective ends of the articulated body means 12 could be formed of a load or force cell assembly 182, as at the left end as viewed in FIG. 23, and an anchor end assembly 180 as at the opposite right end with the cable means 202 and sheathing 204 extending through all of the body portions 40A and 40B between such ends.

The embodiment of FIG. 24 illustrates that if desired the respective opposite ends of the articulated body means 12 may be formed by respective load or force cell assemblies 182 and that at some selected stage, intermediate the assemblies 182, a double form of anchor end assembly 180 could be interposed. That is, in a single rigid outer housing abutment plates 190—190 and rods 196—196 would be contained and oriented as to have one of the rods 196 operatively connected to cable means 202 leading to one of the load cell assemblies 182 while the other rod 196 would be operatively connected to other cable means 202 leading to the other load cell assembly 182. In such an arrangement, a greater ability to select tension forces through the body means 12 exists because, for example, it becomes possible to select, if desired, a greater resilient force at the left side of the structure in FIG. 24 while actually not effecting the then existing tension in the right side of the overall structure.

FIGS. 25, 26 and 27 illustrate, by way of example, some forms of hanger means employable in the practice of the invention.

In FIG. 25, the hanger means 28 is illustrated as comprising opposite arm portions 250 and 252 which may be placed about selected body segments 40 and frictionally secured thereto as by screws or bolts received within passages 254 and 256. The accessory means 30, 32, 34 and 36 may be supported as within spaced channels 258, 260, 262 and 264. Flexible retainers or keepers 266 and 268 may be secured over such channels as by deflectable retainer heads 270, 272 carried by the arms 250, 252.

FIG. 26 illustrates the hanger means 28 as comprising a unitary metal strap-like member provided with a generally medial body portion 274 which is integral with generally laterally extending arms 276 and 278 respectively having bight portions and bent-back spaced arm portions 280 and 282. The hanger 28 may be secured to a selected body segment 40 as by screws extending through suitable apertures 284 and 286. A captive type latching arm 288 may be disengageably latched to arm 282 as at 292 and captively secured to arm 280 as at 290.

FIG. 27 illustrates the hanger means 28 as comprising a unitary metal strap-like member provided with a generally medial body portion 294 which is integral with generally laterally extending arms 296 and 298 respectively having bight portions and bent-back spaced arm portions 300 and 302. The arms 300 and 302 may be comparatively short and normally spaced from and above the accessories 30, 32, 34 and 36. To compensate for such vertical space and to resiliently apply a downward force against the accessory means, rubber or other elastomeric tubular members 304 and 306 are applied about arms 300 and 302 and such are also employed as abutment means for preventing the possible escape of the accessory means between the ends of the arms 300, 302 and the medial body portion 294.

Referring again primarily to FIGS. 2–5, 7, 10, 12 and 13, it should be specifically noted that the centerline or axis of each of the apertures or passages 52 and/or 52*b* are eccentrically disposed with respect to the axis of the bearing or pivot means.

For example, if in FIGS. 2 and 3, axis 310 depicts the axis of the pivot or bearing means 142 and 142*b* (about which articulation is to take place) then it can be seen that the axis 312 of aperture or passage 52 is eccentrically displaced (upwardly as viewed in FIG. 2) but still medially between the generally left and right sides (as also viewed in FIG. 2). Further, it should be noted that in all of such body portions, the direction of the eccentric displacement is toward that semi-cylindrical portion, of the bell or spigot body portion, which, during articulation in a direction from a home or neutral position, will be moving away from the juxtaposed portion of the adjacent body segment.

It should be remembered, as previously stated, that the cable means 202 and sheathing 204 extend through all of such apertures or passages 52 and/or 52*b*. Consequently, it should therefore now be apparent that any tension forces in the cable means 202 will at each pivotal juncture of, for example, two body segments 40, exert a resisting force (resisting the pivotal articulation of the segments) the magnitude of which is at least in part determined by the magnitude of the eccentricity of axis 312 (312b as the case may be which serves as a lever arm. Therefore, for the most part, with the cable means 202 holding the related plurality of segments in compression, of a selected magnitude, it becomes possible to cause flexing or articulation at any particular required location simply be overcoming the force at that juncture (of the two adjacent segments). As generally indicated by the arrangements in FIGS. 22, 23 and 24 it is possible to combine and arrange various body segments in the overall body means 12 as to achieve any desired degree and/or direction of motion and articulation to meet the particular needs.

Figure 28:
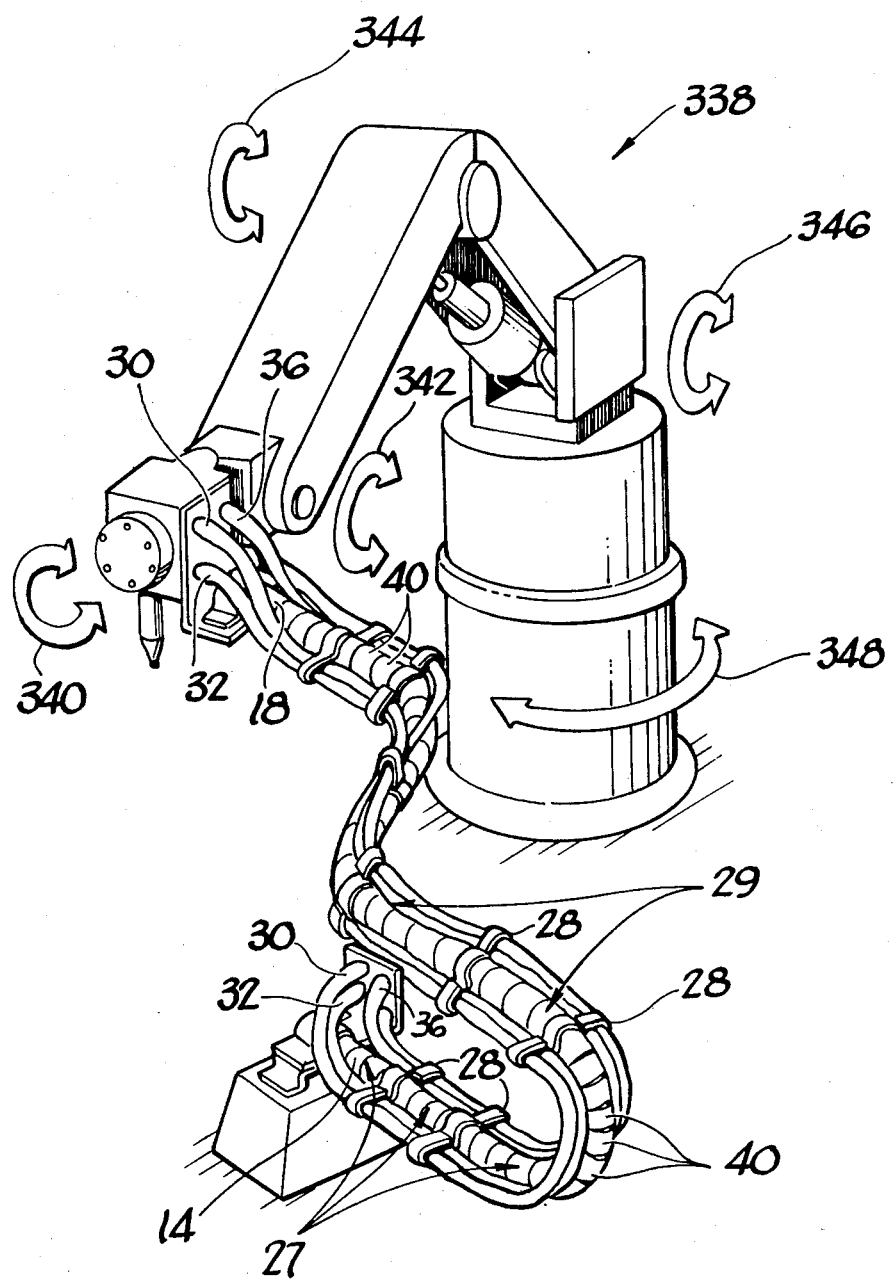
FIG. 28 depicts, in a somewhat simplified manner, a robotic machine, such as a welding machine, in combination with a flexible support and carrier assembly employing teachings of the invention.

FIG. 28 illustrates the flexible support means 12 as applied to, for example, a robotic welding machine 338 which has degrees of motion at least as indicated by the directional arrows 340, 342, 344, 346 and 348. The support means 12 can accomodate all of such movements. Further, it should be pointed out that the base end 14 may actually be pivotally mounted to even further enhance the overall operation of the combination of the support assembly 12 and machine 338. As possibly best appreciated from the illustration of FIG. 28, it is clear that the articulated support assembly 12, by virtue of its tensioned resiliently biased cable means 202 will always exhibit a force tending to move the various body segments to respective null or home positions wherein the overall structure 12 would tend to assume a generally straight line or even some other preselected stable or null configuration. Consequently, the arm-like portion 29 shown in FIG. 28 as being disposed relatively above the arm-like portion 27 (both arm-like portions 27 and 29 being, obviously, of variable effective length) will continuously tend to move or swing generally upwardly about the then bight portion interconnecting such upwardly and downwardly disposed arm-like portions 29 and 27. Such resilient tendency, of course, serves to support the weight of the accessory means carried thereby so as not to require the machine to support such accessories. FIG. 28 illustrates a combination wherein the flexible support means 12 of the invention is effectively mounted by its lower end 14 to associated support structure (which could be the floor of a building or other suitable base means) and its upper disposed swingable arm-like portions 29 carries the weight of accessories leading to the machine 338 and also moves, in all degrees of motion, with the associated portion of the machine 338. It should be made clear that the invention may also be practiced by, in effect, reversing the structure 12 so that it hangs as from some overhead support (stationary or mobile) and similarly functions to support the weight of the accessory means leading to the associated machine. This can be readily visualized if one would imagine end 14 and arm-like portion 27 secured as to some overhead support and the arm-like portion 29 actually below arm-like portion 27 (cooperatively defining the bight portion therebetween) and again swingable in all directions with the associated portion of machine 338 while simultaneously supporting the weight of the accessory means along lower arm-like portion 29.

In the preferred embodiment, a second cable assembly 380 is provided as a type of safety device. As shown in FIGS. 20 and 21, the opposite ends 382 and 384 of the cable means 380 are respectively connected to the anchor end assembly 180, as by means of threaded rod 386, washer 388 and nut 390, which serve to abut against plate 190, and to the load cell assembly 182, as by an end cap member 392 engaged by an abutment member 394. The purpose of such a cable assembly 380 is merely to stop any of the segments 40 to tend to fly away from each other in the event the tensioning cable means 202 should experience a failure.

Although only a preferred embodiment and selected modifications of the invention have been disclosed and described, it is apparent that other embodiments and modifications of the invention are possible within the scope of the appended claims.

What is claimed is:

1. A flexible support and carrier assembly for supporting associated accessory means, comprising a plurality of sequentially arranged body-like segments, said segments being arranged with respect to each other for articulated motion as between adjacent segments, said plurality of sequentially arranged body-like segments defining an elongated articulated structure having first and second ends, spring means operatively connected to at least certain of said plurality of segments, said spring means resiliently resisting while permitting said articulated motion as between adjacent segments to occur in a first direction of articulation, said spring means also resiliently urging said adjacent segments to experience said articulated motion in a second direction of articulation opposite to said first direction, and guard means carried at least by certain of said segments, said guard means functioning to prevent the unintentional incursion of unrelated objects into spaces between said adjacent segments when experiencing articulation.

2. A flexible support and carrier assembly according to claim 1 wherein said plurality of segments are held in adjacent juxtaposition by cable means operatively connected to said spring means, said cable means continually experiencing tension and in so doing applying a compressive force to said plurality of segments.

3. A flexible support and carrier assembly according to claim 1 and further comprising pivot means generally operatively interconnecting adjacent segments, wherein said articulated motion in both said first and said second directions is about the axis of said pivot means, wherein said articulated motion in said first direction at least tends to increase the then existing resilient force of said spring means, and wherein said articulated motion in said second direction at least tends to decrease the then existing resilient force of said spring means.

4. A flexible support and carrier assembly according to claim 1 wherein said guard means comprises first and second guard portions respectively carried by said adjacent segments, said first and second guard portions cooperating with each other to effectively cover space as is created between said adjacent segments during said articulated motion of said adjacent segments.

5. A flexible support and carrier assembly according to claim 3 wherein said guard means comprises first and second guard portions respectively carried by said adjacent segments, said first and second guard portions cooperating with each other to effectively cover space as is created between said adjacent segments during said articulated motion of said adjacent segments, wherein said first and second guard portions respectively comprise fin-like portions which functionally interleave with each other.

6. A flexible support and carrier assembly according to claim 4 wherein said first and second guard portions respectively comprise fin-like portions which functionally interleave with each other.

7. A flexible support and carrier assembly according to claim 1 wherein said articulated motion in both said first and second directions occurs about a pivotal axis, said spring means in resiliently resisting said articulated motion exhibiting a force having a line of action which is skew to said pivotal axis.

8. A flexible support and carrier assembly according to claim 1 wherein said plurality of segments comprises at least first second and third segments arranged as to have said first and second segments adjacent to each other and said second and third segments being next adjacent to each other, wherein said articulated motion in both said first and second directions with respect to said first and second adjacent segments occurs about a first pivotal axis, wherein said articulated motion in both said first and second directions with respect to said second and third adjacent segments occurs about a second pivotal axis, and said spring means in resiliently resisting said articuated motion relative to said first pivotal axis and relative to said second pivotal axis exhibiting a force having a line of action which is skew to said pivotal axes.

9. A flexible support and carrier assembly according to claim 1 wherein said plurality of segments comprises at least first second and third body-like segments arranged as to have said first and second segments adjacent to each other and said second and third segments being next adjacent to each other, wherein said articulated motion in both said first and second directions with respect to said first and second adjacent segments occurs about a first pivotal axis, wherein said articulated motion in both said first and second directions with respect to said second and third adjacent segments occurs about a second pivotal axis, and wherein said first and second pivotal axes are at a skew relationship to each other.

10. A flexible support and carrier assembly according to claim 1 wherein said plurality of segments comprises at least first second and third segments arranged as to have said first and second segments adjacent to each other and said second and third segments being next adjacent to each other, wherein said articulated motion in both said first and second directions with respect to said first and second segments occurs about a first pivotal axis, wherein said articulated motion in both said first and second directions with respect to said second and third adjacent segments occurs about a second pivotal axis, wherein said first and second pivotal axes are at a skew relationship to each other, and said spring means in resiliently resisting said articulated motion relative to said first pivotal axis and relative to said second pivotal axis exhibiting a force having a line of action which is skew to both of said first and second pivotal axes.

11. A flexible support and carrier assembly according to claim 1 and further comprising hanger means, said hanger means being carried by at least certain of said segments and movable therewith, said hanger means being effective to operatively engage and secure said accessory means to said elongated articulated structure.

12. A flexible support and carrier assembly according to claim 1 and further comprising hanger means, said hanger means being separately formed and secured to at least certain of said segments and movable therewith, said hanger means being effective to operatively engage and secure said accessory means to said elongated articulated structure.

13. A flexible support and carrier assembly according to claim 12 wherein said hanger means comprises a plurality of separately formed hanger structures secured to a certain number of said segments and movable therewith, said hanger means being effective to operatively engage and secure said accessory means to said elongated articulated structure, at least one of said hanger structures comprising a generally medially situated mounting body portion effective for mounting to a related segment, and a plurality of hanger arms carried by said mounting body portion and extending therefrom, said hanger arms being effective to operatively carry said accessory means.

14. A flexible support and carrier assembly according to claim 2 wherein said cable means extends at least through certain of said body-like segments, and further comprising sheathing means carried generally about said cable means, and wherein said sheathing means is situated generally between said cable means and at least some of said body-like segments through which said cable means extends.

15. A flexible support and carrier assembly according to claim 7 wherein said cable means extends at least through certain of said body-like segments, and further comprising sheathing means carried generally about said cable means, wherein said sheathing means comprises a generally tubular wall, wherein said sheathing means is situated generally between said cable means and at least some of said body-like segments through which said cable means extends, and wherein the thickness of said generally tubular wall is a factor in determining the distance between said pivotal axis and said line of action which is skew to said pivotal axis.

16. A flexible support and carrier assembly according to claim 15 wherein said thickness of said generally tubular wall is generally uniform for at least the major length of said sheathing means.

17. A flexible support and carrier assembly according to claim 2 wherein at least certain of said body-like segments comprise a generally cylindrical outer body portion and an internally disposed structural portion extending generally transversely of said cylindrical outer body portion, said body-like segments further carrying journal means for determining a first axis for said articulated motion, and passage means formed through said internally disposed structural portion, said passage means comprising a second axis which is skew to said first axis, and wherein said cable means extends through said passage means.

18. A flexible support and carrier assembly according to claim 1 wherein at least certain of said body-like segments comprise a first generally cylindrical body section and a second generally cylindrical body section, wherein said first generally cylindrical body section comprises a first central axis, wherein said second generally cylindrical body section comprises a second central axis, wherein said first and second body sections are fixedly securable to each other as to have said first and second central axes in general alignment with each other.

19. A flexible support and carrier assembly according to claim 18 wherein said first and second body sections are selectively fixedly securable to each other by selectively rotating said first body section about said first central axis relative to said second body section.

20. A flexible support and carrier assembly according to claim 1 wherein said spring means comprises a plurality of springs arranged in a sub-assembly.

21. A flexible support and carrier assembly according to claim 20 wherein said sub-assembly of said plurality of springs is situated at one of said first and second ends.

22. A flexible support and carrier assembly according to claim 20 wherein said plurality of springs are contained between opposed first and second end plate means, and wherein at least one of said end plate means is selectively adjustably positionable as to thereby selectively adjust and determine a pre-load in said plurality of springs.

23. A flexible support and carrier assembly according to claim 2 wherein said spring means comprises a plurality of springs arranged in a sub-assembly, wherein said plurality of springs are contained between opposed first and second end plate means, wherein said cable means is operatively connected to said first end plate means, and wherein at least one of said end plate means is selectively adjustably positionable as to thereby selectively adjust and determine a pre-load in said plurality of springs and the tension in said cable means.

24. A flexible support and carrier assembly for supporting associated accessory means, comprising a plurality of sequentially arranged body-like segments, said segments being arranged with respect to each other for articulated motion as between adjacent segments, said plurality of sequentially arranged body-like segments defining an elongated articulated structure having first and second ends, spring means operatively connected to at least certain of said plurality of segments, said spring means resiliently resisting while permitting said articulated motion as between adjacent segments to occur in a first direction of articulation, said spring means also resiliently urging said adjacent segments to experience said articulated motion in a second direction of articulation opposite to said first direction, holding cable means, said cable means being operatively connected to said spring means, said cable means being effective to hold said plurality of segments in adjacent juxtaposition, said cable means experiencing tension and in so doing applying a compressive force to said plurality of segments, and safety restraining cable means, said safety cable means extending along at least a major portion of said elongated articulated structure to keep segments from being uncontrollably propelled away from each other in the event said holding cable means should break, wherein said spring means comprises a plurality of springs arranged in a sub-assembly, wherein said sub-assembly of said plurality of springs is situated at one of said first and second ends, and wherein said sub-assembly is removable from said elongated articulated structure.

25. A flexible support and carrier assembly for supporting associated accessory means, comprising a plurality of sequentially arranged body-like segments, said segments being arranged with respect to each other for articulated motion as between adjacent segments, said plurality of sequentially arranged body-like segments defining an elongated articulated structure having first and second ends, resiliently deflectable restraining means, said resiliently deflectable restraining means resiliently resisting while permitting said articulated motion as between adjacent segments to occur in a first direction of articulation, said resiliently deflectable restraining means also resiliently urging said adjacent segments to experience said articulated motion in a second direction of articulation opposite to said first direction, guard means carried at least by certain of said segments, said guard means functioning to prevent the unintentional incursion of unrelated objects into spaces between said adjacent segments when experiencing articulation, and safety restaining cable means, said safety cable means extending along at least a major portion of said elongated articulated structure to keep said segments from being uncontrollably propelled away from each other in the event said resiliently deflectable restraining means should break.

26. A flexible support and carrier assembly for supporting associated accessory means, comprising a plurality of sequentially arranged body-like segments, said segments being arranged with respect to each other for articulated motion as between adjacent segments, said plurality of sequentially arranged body-like segments defining an elongated articulated structure having first and second ends, spring means, said spring means resiliently resisting while permitting said articulated motion as between adjacent segments to occur in a first direction of articulation, said spring means also resiliently urging said adjacent segments to experience said articulated motion in a second direction of articulation opposite to said first direction, holding cable means, said cable means being operatively connected to said spring means, said cable means being effective to hold said plurality of segments in adjacent juxtaposition, said cable means experiencing tension and in so doing applying a compressive force to said plurality of segments, safety restraining cable means, said safety cable means extending along at least a major portion of said elongated articulated structure to keep said segments from being uncontrollably propelled away from each other in the event said holding cable means should break, and guard means carried at least by certain of said segments, said guard means functioning to prevent the unintentional incursion of unrelated objects into spaces between said adjacent segments when experiencing articulation.

* * * * *

UNITED STATES PATENT AND TRADEMARK OFFICE
CERTIFICATE OF CORRECTION

PATENT NO. : 4,625,936
DATED : December 2, 1986
INVENTOR(S) : Edward L. Hadden, Sr.

It is certified that error appears in the above—identified patent and that said Letters Patent is hereby corrected as shown below:

Column 7, line 40, change "loged" to ---
--- lodged ---.

Column 7, line 43, between "same" and "elevation" insert --- general or relative ---.

Signed and Sealed this

Twenty-fourth Day of February, 1987

Attest:

DONALD J. QUIGG

Attesting Officer

Commissioner of Patents and Trademarks